United States Patent
Yeh et al.

(10) Patent No.: US 12,431,722 B2
(45) Date of Patent: Sep. 30, 2025

(54) POWER-SAVING CHARGING DEVICE

(71) Applicant: ACBEL POLYTECH INC., New Taipei (TW)

(72) Inventors: Chia-An Yeh, New Taipei (TW); Wei-Liang Lin, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 624 days.

(21) Appl. No.: 17/897,915

(22) Filed: Aug. 29, 2022

(65) Prior Publication Data
US 2024/0072552 A1    Feb. 29, 2024

(51) Int. Cl.
*H02J 7/00*    (2006.01)

(52) U.S. Cl.
CPC ......... *H02J 7/0032* (2013.01); *H02J 2207/10* (2020.01)

(58) Field of Classification Search
CPC .................................................... H02J 7/0032
USPC ......................................................... 320/107
See application file for complete search history.

(56) References Cited

U.S. PATENT DOCUMENTS

| | | | |
|---|---|---|---|
| 8,687,392 B2 | 4/2014 | Sims et al. | |
| 8,830,373 B2 * | 9/2014 | Shen | H04N 23/50 |
| | | | 348/370 |
| 9,866,229 B2 | 1/2018 | Huang et al. | |
| 10,320,301 B2 | 6/2019 | Chung et al. | |
| 11,742,677 B2 * | 8/2023 | Moll | H02J 7/0045 |
| | | | 320/107 |
| 2016/0049801 A1 | 2/2016 | Yoda et al. | |
| 2020/0395858 A1 * | 12/2020 | Hirabayashi | G05F 1/56 |

* cited by examiner

*Primary Examiner* — Yalkew Fantu
(74) *Attorney, Agent, or Firm* — Snell & Wilmer L.L.P.

(57) ABSTRACT

A power-saving charging device controls both a primary side controller and a secondary side controller to be in a shut-down state when an output terminal is not connected to the load. When the output terminal is connected to the load, the secondary side controller receives a power-on power supply from a power storage unit, performs a power-on procedure and enters a working state. The primary side controller receives a power-on signal from the power storage unit, performs the power-on procedure according to the power-on signal, and enters the working state. Accordingly, when the charging device is not connected to the load, it can enter a standby state with extremely low power consumption in which the primary side controller and the secondary side controller are both turned off, thereby achieving the effect of saving the power consumption of the controller when the charging device is in standby.

13 Claims, 7 Drawing Sheets

POWER-SAVING CHARGING DEVICE

BACKGROUND OF THE INVENTION

1. Field of the Invention

This invention is related to a charging device, particularly to a power-saving charging device.

2. Description of the Related Art

In recent years, the use of portable electronic devices has become more and more common. Most people often carry various electronic devices such as mobile phones, tablet computers, Bluetooth headsets and so on. Therefore, charging devices are usually placed in different places, such as the bedroom, living room, or office, to facilitate charging at any time. According to the usage habits of most people, when charging is completed or when they are about to leave, since other places are already equipped with charging devices, they do not unplug the charging device from the socket and take it with them, but leave it on the socket. Under this condition, the output terminal of the charging device is not connected to the load device (electronic device), and the charging device has no power at the output terminal and also no power output at the output terminal. This condition is generally known as the "standby state" of the charging device. In the standby state, the socket usually continuously provides power to the transformer in the charging device to maintain the operation of the circuit controller in the charging device, so that it can be activated at any time when the output terminal is connected to the load device. However, continuous consumption of power in standby state results in power wasted.

Chinese Patent Publication No. 111669065A proposes a method to reduce the standby power of a charging device. After the charging device is disconnected from a load device for a period of time, the transformer will reduce the output voltage to a preset limit to maintain standby operations of the processor IC. When the charging device detects that the load device is connected, the standby operation mode is released. Although the method of this patent can reduce the power loss during standby operation, the transformer still needs to provide the power for the processor IC to operate in the standby mode. Obviously, the effect of reducing power loss is limited.

U.S. Pat. No. 8,242,359B2 proposes a power-saving power adapter/charging device, which adopts a physical switch installed on the output terminal of the charging device. This physical switch can directly control the state of the power supply, and feedback the output current device through the inductive resistance at the output terminal. When at low or zero current, the signal is sent to the main controller through the photocoupling element to turn it off. When the output terminal of the charging device is reconnected to a load device, the physical switch must be manually turned on. Although the method of this patent reduces the loss during standby by turning off the main controller, it is not easy to implement. An additional physical switch must be added, and the restart must be manually controlled, which does not meet the needs of convenience. In addition, the physical switch is installed between the supply mains and the output terminal of the charging device, which will also cause considerations of safety regulations and isolation distance.

SUMMARY OF THE INVENTION

In view of that the conventional charging device still loses power even when the load device is not connected, and that the existing technology for reducing the standby loss of the charging device still has defects, the present invention proposes a power-saving charging device.

The power-saving charging device comprises:
a transformer including a primary side winding and a secondary side winding;
an output switch having a control terminal;
a primary side circuit electrically connected between the two input terminals of the charging device and the primary side winding;
a secondary side circuit, electrically connected to the secondary side winding and connected to an output terminal of the charging device through the output switch;
a primary side controller, electrically connected to the primary side circuit;
a secondary side controller, electrically connected to a power storage unit, the control terminal of the output switch and the primary side controller;
wherein when the output terminal is in an unconnected state, both the primary side controller and the secondary side controller are in a shutdown state;
wherein when the output terminal is switched from the unconnected state to a connected state, the power storage unit provides a power-on to the secondary side controller to allow the secondary side controller to perform a power-on procedure and enter a working state; the primary side controller receives a power-on signal from the power storage unit, and the primary side controller performs the power-on procedure according to the power-on signal and enters a working state.

In the power-saving charging device (referred to as the charging device) of the present invention, when the output terminal is in an unconnected state, that is, in a standby state in which no load device is connected to the output terminal of the charging device, both the primary side controller and the secondary side controller are in the off state, so that the power loss of the charging device in the standby state is reduced to an extremely low level. When the charging device switches from the unconnected state to the connected state, that is, when a load device is connected to the output terminal, the power storage unit provides the power-on power to the secondary side controller, so that the secondary side controller performs the power-on procedure and enters the working state. The power storage unit further provides the power-on signal to the primary side controller, so that the primary side controller enters a power-on procedure. After the primary side controller enters the power-on procedure, it can generate an initial control signal to make the primary side circuit work. The primary side controller transmits the input power received by the input terminal to the transformer, makes the transformer start to convert electric energy and provides the voltage required for the primary side controller and the secondary side controller to work, and makes the charging device enter the normal working state from the original standby state.

The charging device of the present invention can effectively reduce the internal power consumption in the standby state. The process from the standby state to connect the load device and enter the normal working state can be performed completely autonomously without manual operation, solving the shortcomings of the prior art that the power consumption of the charging device in the standby state cannot be further reduced and the use is inconvenient.

DETAILED DESCRIPTION OF THE INVENTION

Figure 1:
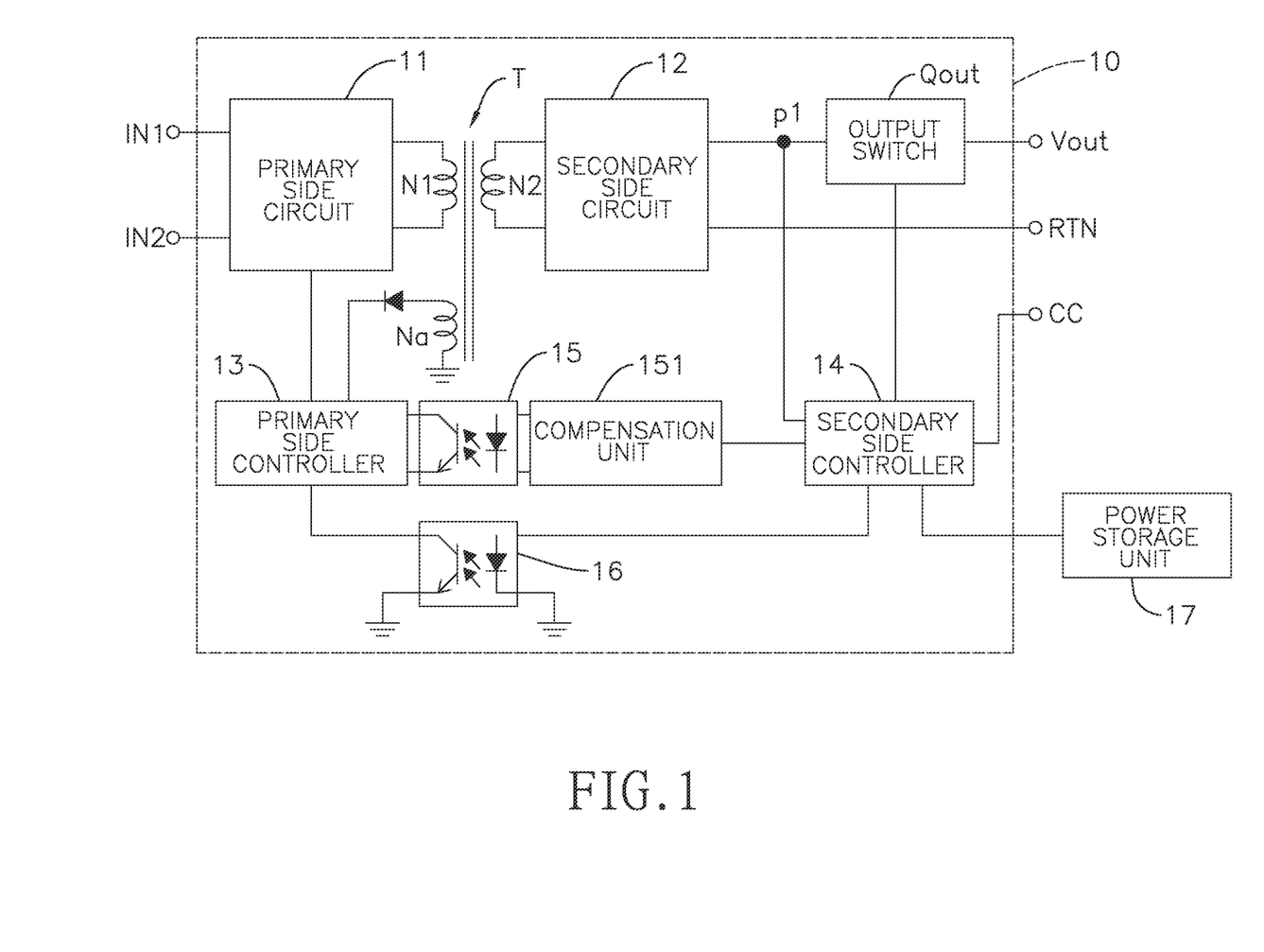
FIG. 1 is a block diagram of the present invention.

With reference to FIG. 1, a power-saving charging device (charging device 10) of the present invention includes two input terminals IN1, IN2, an output terminal Vout, a transformer T, an output switch Qout, a primary side circuit 11, a secondary side circuit 12, a primary side controller 13 and a secondary side controller 14.

The two input terminals IN1, IN2 are connected to an input power. The transformer T includes a primary side winding N1 and a secondary side winding N2 coupled with each other. A power input terminal and a power output terminal of the primary side circuit 11 are respectively electrically connected to the two input terminals IN1, IN2 and the primary side winding N1. The primary side circuit 11 is controlled by the primary side controller 13 to transmit the input power to the primary side winding N1. The primary side controller 13 is, for example, a pulse width modulation (PWM) processor.

The power input terminal of the secondary side circuit 12 is electrically connected to the secondary side winding N2, and the power output terminal of the secondary side circuit 12 is connected to the output terminal Vout through the output switch Qout to transmit the voltage generated by the secondary winding N2 of the transformer T to the output terminal Vout through the output switch Qout. The primary side controller 13 is electrically connected to the primary side circuit 11 to control the primary side circuit 11.

The secondary side controller 14 is electrically connected to a connection node p1 between the secondary side circuit 12 and the output switch Qout, a control terminal of the output switch Qout and the primary side controller 13. The secondary side controller 14 controls the on-off state of the output switch Qout, and controls the primary side controller 13 according to the voltage feedback of the connection node p1. Preferably, the output switch Qout is, for example, an NMOS (N-Type Metal-oxide semiconductor) transistor.

Preferably, the transformer T further includes an auxiliary winding Na, which is coupled with the primary side winding N1 or the secondary side winding N2. When the primary side controller 13 is working, the primary side circuit 11 works normally and transmits the input power to the primary side winding N1. Through the conversion of the transformer T, the auxiliary winding Na generates a working voltage and supplies it to the primary side controller 13 to keep the primary side controller 13 working. Through the conversion of the transformer T, the output voltage generated by the secondary side circuit 12 is provided to the secondary side winding N2. The output voltage is provided to the output terminal Vout through the secondary side circuit 12 and the output switch Qout, and the secondary side controller 14 receives the output voltage from the output terminal Vout to maintain operation.

At this time, the output terminal Vout is connected to a load device 20, such as any electronic device to be charged, and the load device 20 normally receives the output voltage from the output terminal Vout for charging, that is, the normal operation of the charging device 10 provides the output voltage to the load device 20.

The load device 20 includes, for example, a load battery 21, a load switch 22 and a power supply coordination unit 23.

In the working state, the secondary side controller 14 not only obtains a working power from the output terminal Vout, but also detects a load connection state of the output terminal Vout. More specifically, the charging device 10 further includes a communication terminal CC, and the communication terminal CC is used for connecting with the power supply coordination unit 23 of the load device 20 to transmit charging related information. The secondary side controller 14 detects the signal state of the communication terminal CC to determine the load connection state of the output terminal Vout.

When the load device 20 is removed from the output terminal Vout of the charging device 10, the connection between the secondary side controller 14 and the load device 20 at the communication terminal CC is interrupted. When the secondary side controller 14 determines that the load connection state of the output terminal Vout is unconnected, the secondary side controller 14 generates and transmits a shutdown signal to the primary side controller 13 to shut down the primary side controller 13.

After the primary side controller 13 is shut down, the primary side circuit 11 also stops working and interrupts the input power transmitted to the primary side winding N1, so that the output voltage generated by the secondary side winding N2 drops. The secondary side controller 14 also shuts down after sending the shutdown signal, so that the charging device 10 enters a standby state in which both the primary side controller 13 and the secondary side controller 14 are turned off.

When the output terminal Vout is switched from an unconnected state to a connected state, that is, one load device 20 is connected to the output terminal Vout of the charging device 10, and a power storage unit 17 provides a power-on power to the secondary side controller 14, and the secondary side controller 14 performs a power-on procedure and enters a working state. When the primary side controller 13 receives a power-on signal from the power storage unit 17, the primary side controller 13 performs a power-on procedure, so that the primary side circuit 11 starts to work and enters the working state.

Figure 2:
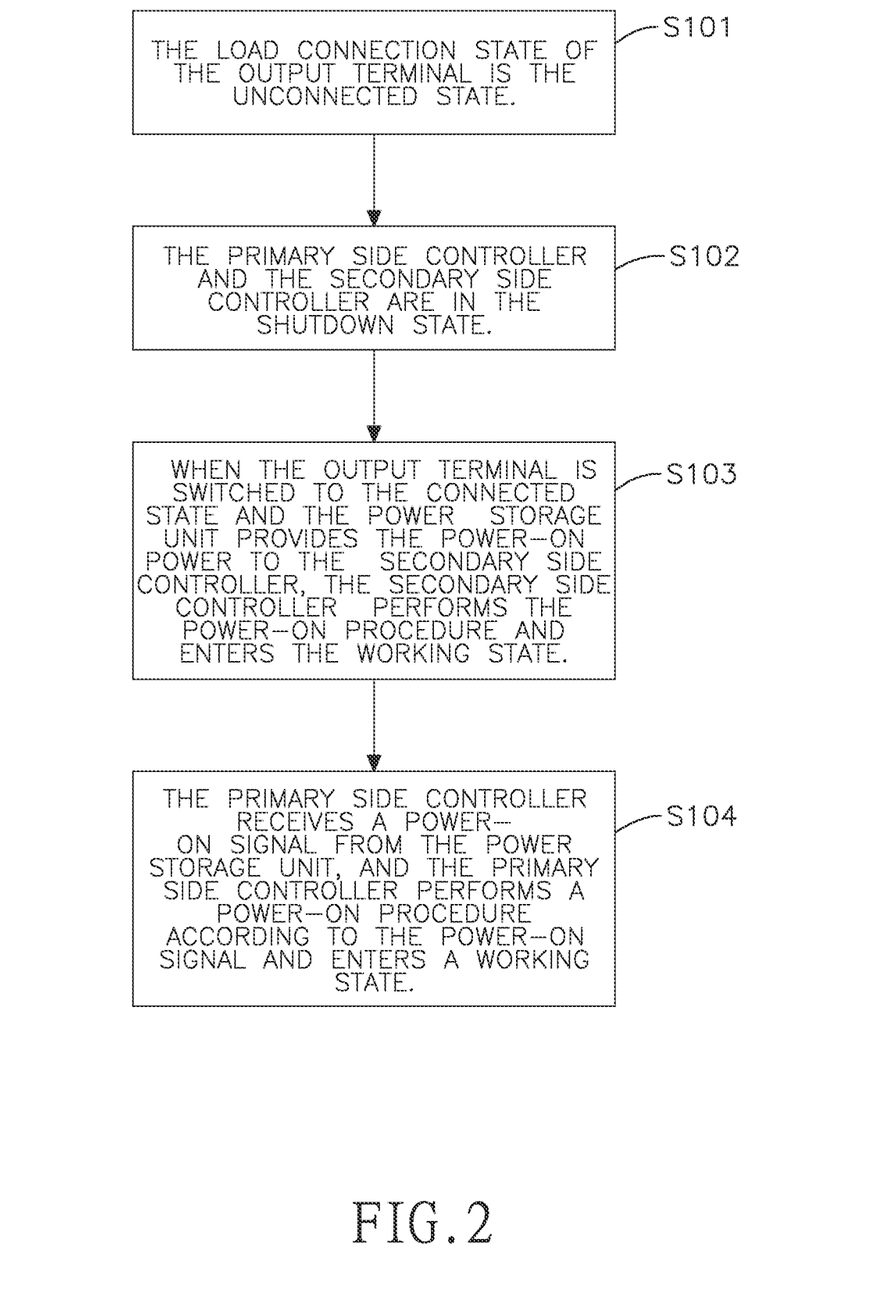
FIG. 2 is a flowchart of a control method performed by the power-saving charging device of the present invention.

With reference to FIG. 2, the charging device of the present invention mainly performs the following steps:
When the load connection state of the output terminal Vout is the unconnected state (S101), the primary side controller 13 and the secondary side controller 14 are kept in a shutdown state (S102);
When the output terminal Vout is switched from the unconnected state to the connected state and the power storage unit 17 provides the power-on power to the secondary side controller 14, the secondary side controller 14 performs the power-on procedure and enters the working state (S103);
The primary side controller 13 receives a power-on signal from the power storage unit 17, and the primary side controller 13 performs a power-on procedure according to the power-on signal and enters a working state (S104).

Figure 3:
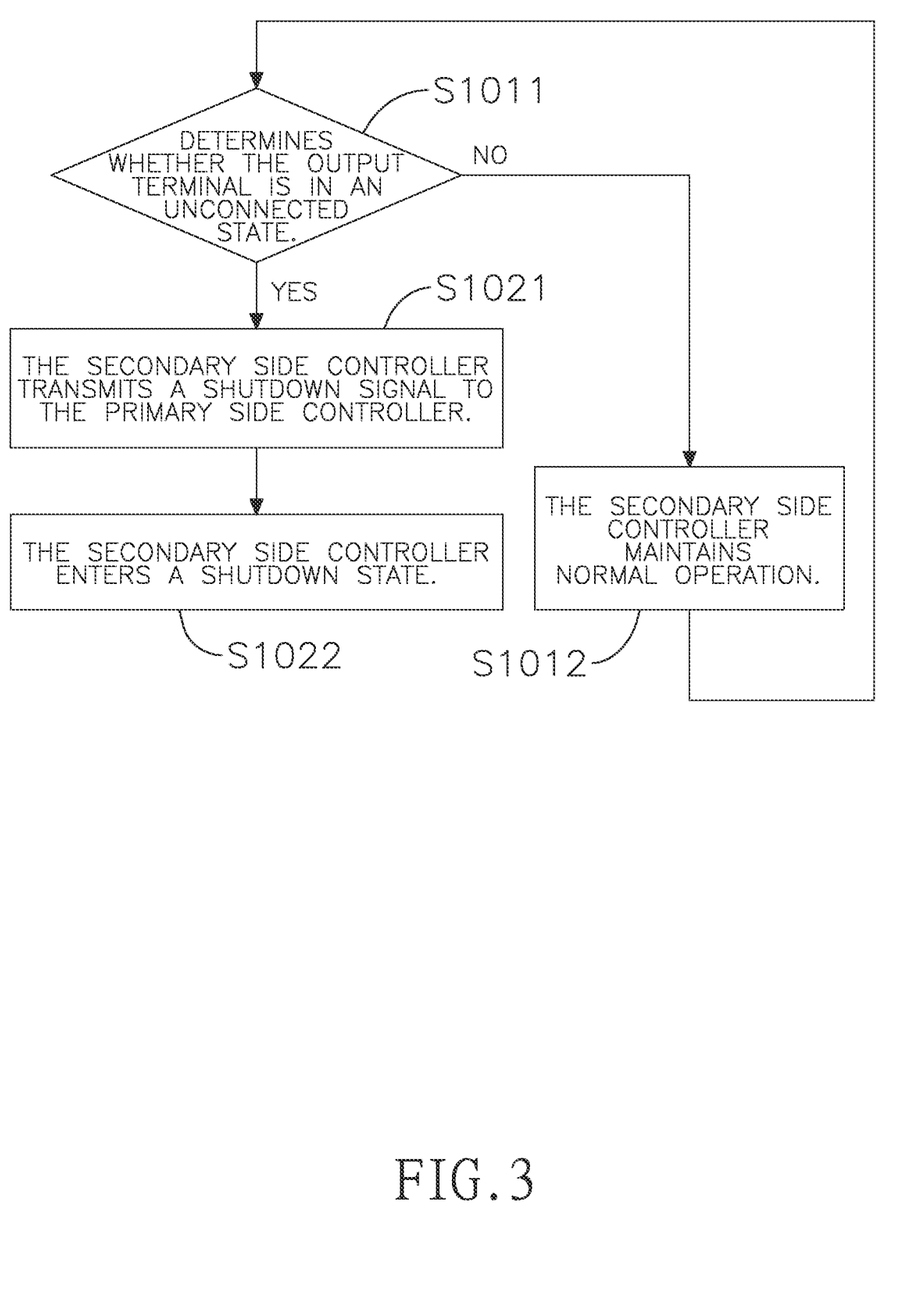
FIG. 3 is another flowchart of a control method of a power-saving charging device of the present invention.

With reference to FIG. 3, preferably, steps S101-S102 include the following sub-steps:

When the secondary side controller 14 is in the working state, the secondary side controller 14 determines whether the output terminal Vout is in an unconnected state by detecting the state of the communication terminal CC (S1011);

If so, execute step S102, which includes the following sub-steps:

The secondary side controller 14 transmits a shutdown signal to the primary side controller 13, making the primary side controller 13 enter a shutdown state (S1021);

The secondary side controller 14 enters a shutdown state (S1022).

On the contrary, if the secondary side controller 14 determines that the output terminal Vout is not in an unconnected state, that is, the output terminal Vout is connected to the load device 20, the secondary side controller 14 maintains normal operation in coordination with the primary side controller 12 (S1012), and the charging device 10 maintains power supply.

With reference to FIG. 1, preferably, the charging device 10 further includes a feedback isolation unit 15, and the secondary side controller 14 is connected to the primary side controller 13 through the feedback isolation unit 15. The feedback isolation unit 15 is, for example, a photocoupling element, and the secondary side controller 14 is connected to the feedback isolation unit 15 through a compensation unit 151. In the working state, the secondary side controller 14 transmits a feedback control signal to the primary side controller 13 through the feedback isolation unit 15 according to the voltage of the connection node p1, to cooperatively control the operation of the primary side circuit 11.

The present invention provides four embodiments of the power storage unit 17. The following provides further detailed descriptions of the arrangement of the power storage unit 17 and the method for the power storage unit 17 to provide the power-on power and the power-on signal.

Figure 4:
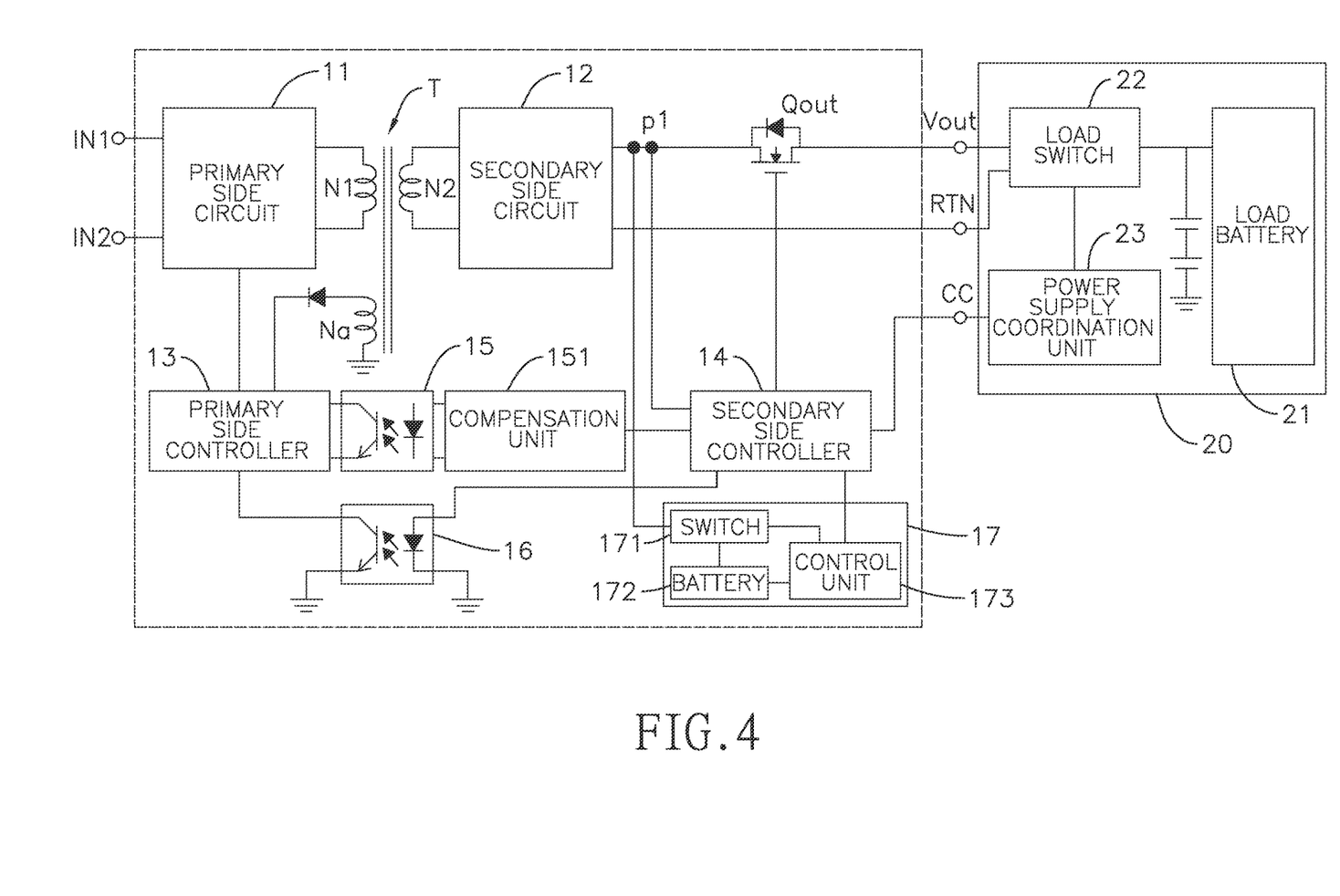
FIG. 4 is a circuit diagram of a first embodiment of a power-saving charging device of the present invention.

With reference to FIG. 4, in a first embodiment of the invention, the charging device 10 further includes the power storage unit 17. Preferably, the power storage unit 17 includes a switch 171, a battery 172 and a control unit 173. The battery 172 is electrically connected to the secondary side controller through the switch 171. The control unit 173 is electrically connected to the battery 172 to maintain operation by the power of the battery 172, and is electrically connected to a control terminal of the switch 171 to control the switch 171. Preferably, the battery 172 is connected to the connection node p1, so the secondary side controller 14 receives the power-on power provided by the power storage unit 17 through the connection node p1.

The power storage unit 17 is disposed inside the charging device 10 for storing and providing the power-on power required by the secondary side controller 14 and the power-on signal required by the primary side controller 13. The control unit 173 of the power storage unit 17 is electrically connected to the secondary side controller 14 and detects a communication start signal received by the secondary side controller 14 from the communication terminal CC.

When the output terminal Vout is switched from the unconnected state to the connected state, that is, when the load device 20 is connected to the output terminal Vout and the communication terminal CC, the control unit 173 detects the communication start signal, the control unit 173 detects the communication start signal, and therefore controls the switch 171 to switch from off to on, so that the battery 172 outputs the power-on power to the secondary side controller 14. Accordingly, the power storage unit 17 provides the power-on power to the secondary side controller 14 according to the communication start signal. The secondary side controller 14 performs a power-on procedure to enter the working state.

After the secondary side controller 14 is powered on by the power-on power of the power storage unit 17, it enters the working state. The secondary side controller 14 provides the power-on power to the primary side controller 13 through the power-on signal generated by a power isolation unit 16. The primary side controller 13 receives the power-on signal, and obtains power according to the power-on signal to perform a power-on procedure, so that the primary side circuit 11 starts to work and the primary side controller 13 enters the working state completely. The power isolation unit 16 is, for example, a photo-coupling element.

Due to the reason that the primary side circuit 11 and the secondary side circuit 12 should be electrically isolated from each other, the power-on power of the power storage unit 17 cannot be directly provided to the primary side controller 13. The power-on power of the power storage unit 17 needs to be provided to the primary side controller 13 through the power isolation unit 16.

The power-on signal generated by the power isolation unit 16 starts the power-on procedure of the primary side controller 13. The primary side controller 13 generates an initial control signal for the primary side circuit 11. The primary side circuit 11 starts to work and transfers the input power to the primary side winding N1 of the transformer T.

Once the voltage on the transformer T builds up, the primary side controller 13 can obtain the power-on power required to complete the power-on procedure from the auxiliary winding Na of the transformer T to enter a normal working state.

So far, the power-on procedures of the primary side controller 13 and the secondary side controller 14 have been completed. When the secondary side controller 14 determines that both the primary side controller 13 and the primary side circuit 11 are normally working according to the voltage on the connection node p1, and can provide an output voltage at the output terminal Vout, the secondary side controller 14 can further conduct the communication of the power supply coordination with the power supply coordination unit 23 of the load device 20. After the secondary side controller 14 completes the communication of the power supply coordination, it turns on the output switch Qout, and outputs power to the load device 20 through the output terminal Vout, and the charging device 10 enters a normal power supply state.

Figure 5:
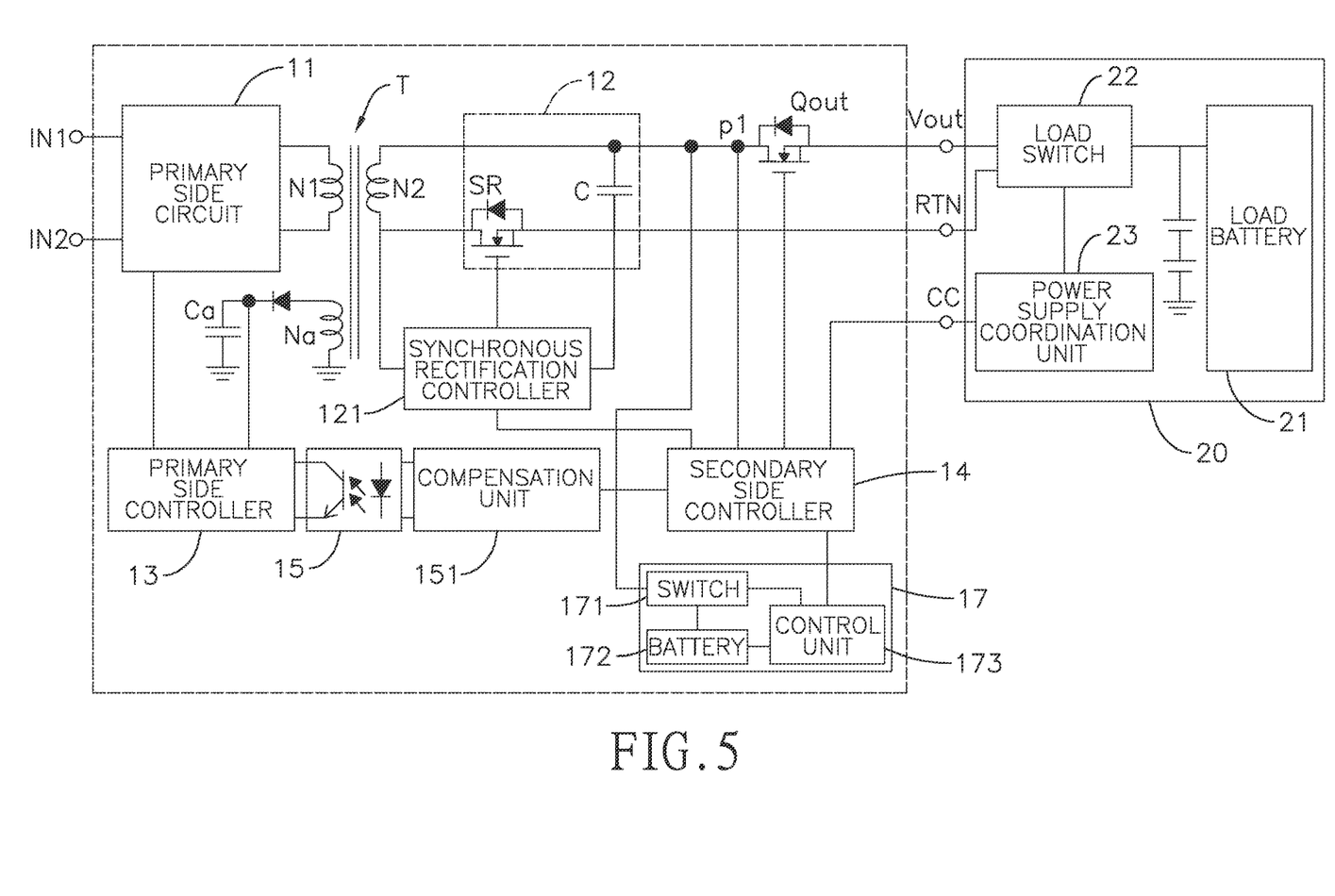
FIG. 5 is a circuit diagram of a second embodiment of a power-saving charging device of the present invention.

With reference to FIG. 5, in a second embodiment of the invention, which is similar to the first embodiment, the charging device 10 includes the power storage unit 17. The power storage unit 17 is electrically connected to the connection node p1, and the secondary side controller 14 is connected to the connection node p1 to connect to the power storage unit 17 and receive the power-on power.

In this embodiment, the transformer T is a bidirectional transformer T. The secondary side circuit 12 enables the transformer T to receive input power from the secondary side winding N2, and the auxiliary winding Na generates an output voltage after being converted by the transformer T.

When the output terminal Vout is connected to the load device 20, the control unit 173 of the power storage unit 17 detects the communication start signal received by the communication terminal CC through the secondary side controller 14 and turns on the switch 171. The battery 172 provides the power-on power to the connection node p1.

The secondary side controller 14 receives the power-on power from the connection node p1 to enter the working state and controls the secondary side circuit 12 to work. The power-on power on the connection node p1 is transmitted to the secondary winding N2 of the transformer T through the secondary side circuit 12. The transformer T generates the power-on signal on the auxiliary winding Na, and the primary side circuit 11 receives the power-on signal from the auxiliary winding Na.

Preferably, the secondary side winding N2 includes a first end and a second end. The secondary side circuit 12 includes a synchronous rectification switch SR, a synchronous rectification controller 121 and a filter capacitor C. The first end of the secondary side winding N2 is connected to the output terminal Vout through the output switch Qout, and the second end is connected to an output return end RTN of the charging device 10 through the synchronous rectification switch SR.

The filter capacitor C is connected in parallel between the first end and the output return end RTN. The synchronous rectification controller 121 is electrically connected to the control terminal of the synchronous rectification switch SR and the secondary side controller 14. When the secondary side controller 14 enters the working state, the secondary side controller 14 transmits an enabling signal to the synchronous rectification controller 121.

The synchronous rectification controller 121 controls the synchronous rectification switch SR, so that the secondary side circuit 12 transmits the power-on power to the secondary winding N2 of the transformer T.

After the primary side controller 13 receives the power-on signal from the auxiliary winding Na, it executes the power-on procedure.

When the primary side controller 13 receives the power-on signal and enables the primary side circuit 11 to work, the secondary side controller 13 stops transmitting the enabling signal to the synchronous rectification controller 121, so that the secondary side circuit 12 stops working.

The voltage of the power-on signal at the output terminal of the auxiliary winding Na is temporarily maintained by the capacitor Ca until the operation of the primary side circuit 11 establishes the output voltage of the secondary side winding N2 at the connection node p1 and the output terminal of the auxiliary winding Na.

When the voltage of the connection node p1 starts to rise, the secondary side controller 14 determines that the primary side controller 13 has entered the working state according to the voltage rise of the connection node p1 and the primary side circuit 11 starts to work normally, the secondary side controller 14 controls the power storage unit 17 to stop providing the power-on power through the control unit 173, and the charging device 10 enters a normal power supply. In this embodiment, the power-on signal from the power storage unit 17 received by the primary side controller 13 and the power-on power established after the primary side circuit 11 starts to work are both provided by the auxiliary winding Na.

In the first and second embodiments, preferably, when the charging device 10 is in the standby state, that is, the primary side controller 13 and the secondary side controller 14 are both in the off state, the control unit 173 further detects the stored power of the battery 172.

When the control unit 173 determines that the stored power of the battery 172 has dropped to a lower limit of power storage, the control unit 173 actively triggers the switch 171 to switch on and supply power to the secondary side controller 14, so that the secondary side controller 14 and the primary side controller 13 enter the power-on procedure.

When the secondary side controller 14 and the primary side controller 13 enter the working state, the battery 172 of the power storage unit 17 receives the electricity provided by the secondary side circuit 12 through the connection node p1 for charging.

When the secondary side controller 14 determines that the output terminal Vout is in an unconnected state again, the secondary side controller 14 makes the primary side controller 13 and itself enter an off state again, and the charging device 10 returns to a standby state.

Accordingly, the charging device 10 maintains the internal power storage unit 17 to store sufficient electrical energy for the primary side controller 13 and the secondary side controller 14 to perform the power-on procedure, and the charging device 10 is still in a standby state with extremely low power consumption most of the time.

Figure 6:
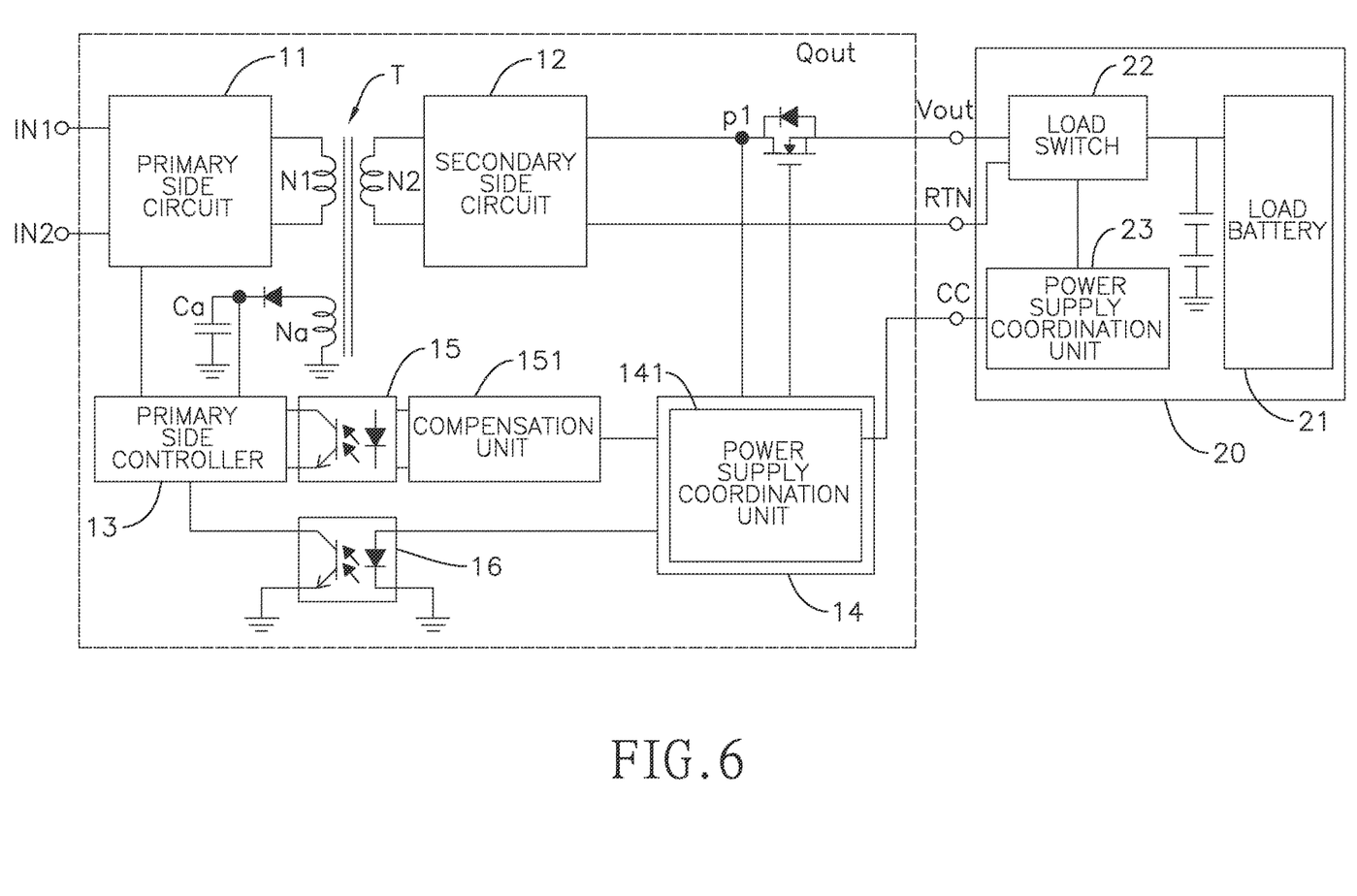
FIG. 6 is a circuit diagram of a third embodiment of a power-saving charging device of the present invention.

With reference to FIG. 6, in a third embodiment of the invention, the power storage unit 17 is a load battery 21 in the load device 20, that is, the load battery 21 should be charged by the charging device 10. In this embodiment, the charging device 10 further includes the power isolation unit 16, and the secondary side controller 14 is electrically connected to the primary side controller 13 through the power isolation unit 16 to provide a power-on signal.

The load device 20 includes the load battery 21, a load switch 22 and a power supply coordination unit 23.

When the output terminal Vout is switched from the unconnected state to the connected state, that is, the load device 20 is connected to the output terminal Vout and the power supply coordination unit 23 of the load device 20 detects the secondary side controller 14 from the communication terminal CC, the load device 20 turns on the load switch 22, so that the load battery 21 provides the power-on power to the output terminal Vout.

The secondary side controller 14 receives the power-on power from the connection node p1 through the output switch Qout. After the secondary side controller 14 receives the power-on power, the secondary side controller 14 generates the power-on signal via the power isolation unit 16 and provides the power-on signal to the primary side controller 13.

In this embodiment, the power-on power is supplied from the output terminal Vout to the secondary side controller 14 by the load device 20 in reverse. When the output switch Qout is in the off state, that is, the voltage of the gate control terminal is lower than the gate threshold, and the source receives a reverse voltage, the output switch Qout can be regarded as an equivalent diode. Therefore, when the load battery 21 in the load device 20 provides the power-on power from the output terminal Vout, the power-on power is transmitted to the connection node p1 through the equivalent diode of the output switch Qout.

After the secondary side controller 14 receives the power-on power supply, similar to the first embodiment of the present invention, the secondary side controller 14 performs a power-on procedure. The secondary side controller 14 generates the power-on signal through the power isolation unit 16 to provide the power-on power to the primary side controller 13. The operation of the primary side controller 13 after entering the power-on procedure is the same as that of the first or second embodiment, and will not be repeated here.

Figure 7:
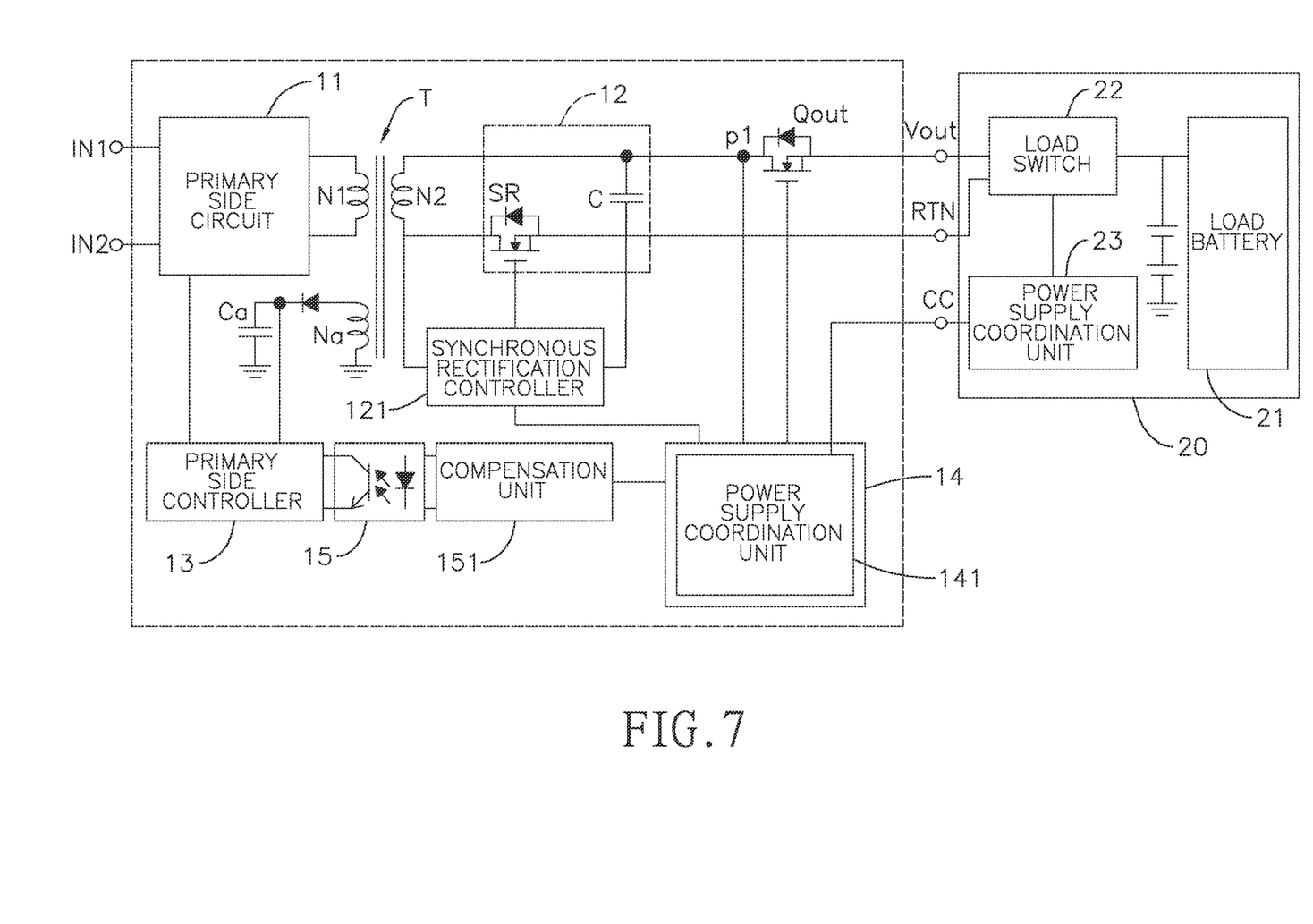
FIG. 7 is a circuit diagram of a fourth embodiment of a power-saving charging device of the present invention.

With reference to FIG. 7, in a fourth embodiment of the invention, the power storage unit 17 is the load battery 21 in the load device 20, that is, the load battery 21 to be charged by the charging device 10, and the transformer T is the bidirectional transformer T.

In this embodiment, the power-on power of the output terminal Vout is provided by the load battery 21. After the equivalent diode of the output switch Qout is provided to the connection node p1 and the secondary side controller 14 enters the working state, similar to the second embodiment, the secondary side controller 14 controls the secondary side circuit 12 to transmit the power-on power to the secondary side winding N2. After the power-on power is converted by the transformer T, the power-on signal is generated by the auxiliary winding Na. The primary side controller 13 receives the power-on signal from the auxiliary winding Na to perform the power-on procedure.

The operation of the primary side controller 13 after entering the power-on procedure is the same as that of the first or second embodiment, and will not be repeated here. In this embodiment, the power-on signal of the load battery 21 and the power-on power established after the primary side circuit 11 starts to work and received by the primary side controller 13 are both provided through the auxiliary winding Na.

Preferably, in the third embodiment and the fourth embodiment, the secondary side controller 14 is electrically connected to the communication terminal CC, and includes a power supply coordination unit 141. The power supply coordination unit 141 communicates with the power supply coordination unit 23 of the load device 20 through the communication terminal CC.

In more detail, when the load device 20 is connected to the output terminal Vout, the power supply coordination unit 141 of the secondary side controller 14 is simultaneously connected to the power supply coordination unit 23 of the load device 20 through the communication terminal CC. Since the secondary side controller 14 is still in the shutdown state, the power supply coordination unit 23 of the load device 20 detects that the communication terminal CC is at a low level. Therefore, the power supply coordination unit 141 controls the load battery 21 to provide a basic power to the charging device 10 as a power-on power source, for example, a power of 5V/1A.

After the secondary side controller 14 completes the power-on procedure by the power-on power, the power supply coordination unit 141 of the secondary side controller 14 can further communicate with the power supply coordination unit 23 of the load device 20. When the power supply coordination unit 141 of the charging device 10 receives a power supply information from the load device 20, the power supply coordination unit 141 generates a power supply request for the power-on power, so that the load device 20 can control and adjust the power supply of the load battery 21 after receiving the power supply request, and further provide the specified power-on power to the output terminal Vout.

In the third embodiment and the fourth embodiment, since the power-on power is supplied from the load device 20 to the charging device 10 in reverse, before the secondary side controller 14 of the charging device 10 enters the shutdown state, the power supply coordination unit 141 sets a device identity state as a load identity.

In this way, when the load device 20 is connected to the output terminal Vout, the power supply coordination unit 141 is connected to the load device 20 through the communication terminal CC, and the secondary side controller 14 enters the power-on process, the power supply coordination unit 141 in the load device 20 will initially communicate with the power supply coordination unit 141 of the secondary side controller 14 with the load identity.

Further, when the secondary side controller 14 and the primary side controller 13 execute the startup procedure from the shutdown state and enter the working state, the power supply coordination unit 141 of the secondary side controller 14 of the charging device 10 further sets the device identity state as a power supply identity, and provides relevant signals to the communication terminal CC.

When the load device 20 determines the charging device 10 has been switched to the power supply status through the communication terminal CC, the load device 20 switches to the load identity according to the communication protocol, stops providing the power-on power to the output terminal Vout of the charging device 10, and waits for the output voltage provided after the charging device 10 to enter a normal power supply state.

Preferably, the power supply coordination unit 141 of the secondary side controller 14 is a processing unit that conforms to the Power Delivery (PD) protocol of Universal Serial Bus (USB).

To sum up, in the present invention, the setting position of the power storage unit 17 can be set in the power storage unit inside the charging device and can use the load battery of the load device as the power storage unit. The transmission path of power-on power and power-on signal can be divided into two ways: through an additional power isolation unit and using a bidirectional transformer to transmit the power-on signal in reverse.

The setting positions of the power storage units can be respectively matched with the transmission paths of the power-on signal, and produce at least four implementations of the first to fourth embodiments.

In the first and second embodiments, the charging device 10 only needs to maintain the operation of the control unit 143 by the battery 172 of the power storage unit 17 when the charging device 10 is in a standby state with no load device 20 connected. The primary side controller 13 and the secondary side controller 14 are in the off state most of the time to avoid the power consumption of maintaining the primary side controller 13 and the secondary side controller 14 continuously running for a long time in the standby state.

In the third and fourth embodiments, the load battery 22 in the load device 20 is used to supply power to the charging device 10 in reverse for the operation of the primary side controller 13 and the secondary side controller 14. Therefore, when the load device 20 is not connected, the primary side controller 13 and the secondary side controller 14 are kept in a shutdown state. This also achieves the purpose of avoiding the power consumption of maintaining the primary side controller 13 and the secondary side controller 14 continuously running for a long time in the standby state.

Overall, the above explanations are not limitations to what is claimed for the invention, but rather examples aimed to show technical ways to solve problems presented in the embodiments of the present invention. In other words, anything related by definition to what is claimed, or any alterations or modifications based from what is claimed are both encompassed by what is claimed.

What is claimed is:

1. A power-saving charging device comprising:
a transformer including a primary side winding and a secondary side winding;
an output switch having a control terminal;
a primary side circuit electrically connected between two input terminals of the charging device and the primary side winding;
a secondary side circuit, electrically connected to the secondary side winding and connected to an output terminal of the charging device through the output switch;
a primary side controller, electrically connected to the primary side circuit;
a secondary side controller, electrically connected to a power storage unit, the control terminal of the output switch and the primary side controller;
wherein when the output terminal is in an unconnected state, both the primary side controller and the secondary side controller are in a shutdown state; and
wherein when the output terminal is switched from the unconnected state to a connected state, the power storage unit provides a power-on power to the secondary side controller to allow the secondary side controller to perform a power-on procedure and enter a working state; the primary side controller receives a power-on signal from the power storage unit, and the primary side controller performs the power-on procedure according to the power-on signal and enters the working state.

2. The power-saving charging device as claimed in claim 1, further including a communication terminal, and the secondary side controller electrically connected to the communication terminal;
wherein when the secondary side controller is in the working state, the secondary side controller determines a load connection state of the output terminal according to the state of the communication terminal; and
wherein when the secondary side controller determines that the load connection state is the unconnected state, the secondary side controller generates and transmits a shutdown signal to the primary side controller, so that the primary side controller enters the shutdown state, and the secondary side controller also enters the shutdown state.

3. The power-saving charging device as claimed in claim 1, further including a communication terminal; the secondary side controller electrically connected to the communication terminal, and the power-saving charging device further including:
the power storage unit, including:
a switch;
a battery, electrically connected to the secondary side circuit and a connection node of the output switch through the switch; and
a control unit electrically connected to the battery, a control terminal of the switch and the secondary side controller, wherein when the output terminal is switched from the unconnected state to the connected state, the output terminal and the communication terminal are connected to a load device; the control unit detects a communication start signal received by the secondary side controller via the communication terminal, and the control unit controls the switch to be turned on to allow the battery to provide the power-on power to the connection node; and
a power isolation unit, the secondary side controller electrically connected to the primary side controller through the power isolation unit;
wherein the secondary side controller is electrically connected to the connection node to receive the power-on power to perform a power-on procedure and enter a working state; the secondary side controller passes the power-on power through the power isolation unit to generate the power-on signal, and provides the power-on signal to the primary side controller.

4. The power-saving charging device as claimed in claim 3, wherein
when both the primary side controller and the secondary side controller are off, the control unit detects stored power of the battery; when the control unit determines that the stored power of the battery is lower than a lower limit of power storage, the control unit turns on the switch, supplies power to the secondary side controller, and allows the secondary side controller and the primary side controller to enter a power-on procedure; and
the secondary side controller and the primary side controller enter the working state, and the battery of the power storage unit is charged by the secondary side circuit via the connection node.

5. The power-saving charging device as claimed in claim 1, further including:
the power storage unit, including:
a switch;
a battery, electrically connected to the secondary side circuit and a connection node of the output switch through the switch; and
a control unit electrically connected to the battery, a control terminal of the switch and the secondary side controller, wherein the transformer is a bidirectional transformer and further includes an auxiliary winding electrically connected to the primary side controller;
wherein when the output terminal is switched from the unconnected state to the connected state, the output terminal and a communication terminal are connected to a load device; the control unit detects a communication start signal received by the secondary side controller from the communication terminal; the control unit controls the switch to be turned on to allow the battery to provide the power-on power to the connection node;
wherein the secondary side controller is electrically connected to the connection node to receive the power-on power; the secondary side controller performs the power-on procedure and enters the working state; the secondary side controller controls the secondary side circuit, so that the power-on power is transmitted to the transformer through the secondary side circuit, and generates a power-on signal at the auxiliary winding; and
wherein the primary side circuit receives the power-on signal from the auxiliary winding.

6. The power-saving charging device as claimed in claim 5, wherein
when both the primary side controller and the secondary side controller are off, the control unit detects stored power of the battery; when the control unit determines that the stored power of the battery is lower than a lower limit of power storage, the control unit turns on the switch, supplies power to the secondary side controller, and allows the secondary side controller and the primary side controller to enter a power-on procedure; and the secondary side controller and the primary side controller enter the working state, and the battery of the power storage unit is charged by the secondary side circuit via the connection node.

7. The power-saving charging device as claimed in claim 1, the power storage unit being a load battery of a load device, and the power-saving charging device further including:
a power isolation unit, the secondary side controller electrically connected to the primary side controller through the power isolation unit;
wherein when the output terminal is switched from the unconnected state to the connected state, the load device is connected to the output terminal, and the load battery provides the power-on power to the output terminal; the secondary side controller receives the power-on power from a connection node through the output switch; and
wherein after the secondary side controller receives the power-on power, the secondary side controller allows the power-on power to pass through the power isolation unit to generate the power-on signal and provide the power-on signal to the primary side controller.

8. The power-saving charging device as claimed in claim 7, further including a communication terminal; wherein
the secondary side controller includes a power supply coordination unit;
when the output terminal is switched from the unconnected state to the connected state, the load device is connected to the output terminal and the power supply coordination unit of the secondary side controller is simultaneously connected to the load device through the communication terminal; and
after the load device provides the power-on power according to the state of the communication terminal for the secondary side controller to perform the power-on procedure, the power supply coordination unit of the secondary side controller further sends a power supply request for the power-on power supply to the load device according to power supply information of the load device received by the communication terminal.

9. The power-saving charging device as claimed in claim 8, wherein
before the secondary side controller enters the shutdown state, the power supply coordination unit sets a device identity state as a load identity; and
when the secondary side controller and the primary side controller execute the power-on procedure from the shutdown state and enter the working state, the power supply coordination unit sets the device identity state as a power supply identity.

10. The power-saving charging device as claimed in claim 1, the power storage unit being a load battery of a load device, wherein
the transformer is a bidirectional transformer and further includes an auxiliary winding electrically connected to the primary side controller;
when the output terminal is switched from the unconnected state to the connected state, the load device is connected to the output terminal, and the load battery provides the power-on power to the output terminal;
the secondary side controller receives the power-on power from the output terminal; the secondary side controller performs the power-on procedure and enters the working state; the secondary side controller controls the secondary side circuit, passes the power-on power through the transformer, and generates the power-on signal at the auxiliary winding; and
the primary side circuit receives the power-on signal from the auxiliary winding.

11. The power-saving charging device as claimed in claim 10, further including a communication terminal; wherein
the secondary side controller includes a power supply coordination unit;
when the output terminal is switched from the unconnected state to the connected state, the load device is connected to the output terminal and the power supply coordination unit of the secondary side controller is simultaneously connected to the load device through the communication terminal; and
after the load device provides the power-on power according to the state of the communication terminal for the secondary side controller to perform the power-on procedure, the power supply coordination unit of the secondary side controller further sends a power supply request for the power-on power supply to the load device according to power supply information of the load device received by the communication terminal.

12. The power-saving charging device as claimed in claim 11, wherein
before the secondary side controller enters the shutdown state, the power supply coordination unit sets a device identity state as a load identity; and
when the secondary side controller and the primary side controller execute the power-on procedure from the shutdown state and enter the working state, the power supply coordination unit sets the device identity state as a power supply identity.

13. The power-saving charging device as claimed in claim 1, further including:
a feedback isolation unit, the secondary side controller connected to the primary side controller through the feedback isolation unit and transmitting feedback control signals.

* * * * *